Feb. 21, 1956 P. T. SNYDER 2,735,539
AUTOMATIC ELECTRICALLY CONTROLLED CONVEYOR
Filed Oct. 1, 1954 3 Sheets-Sheet 1
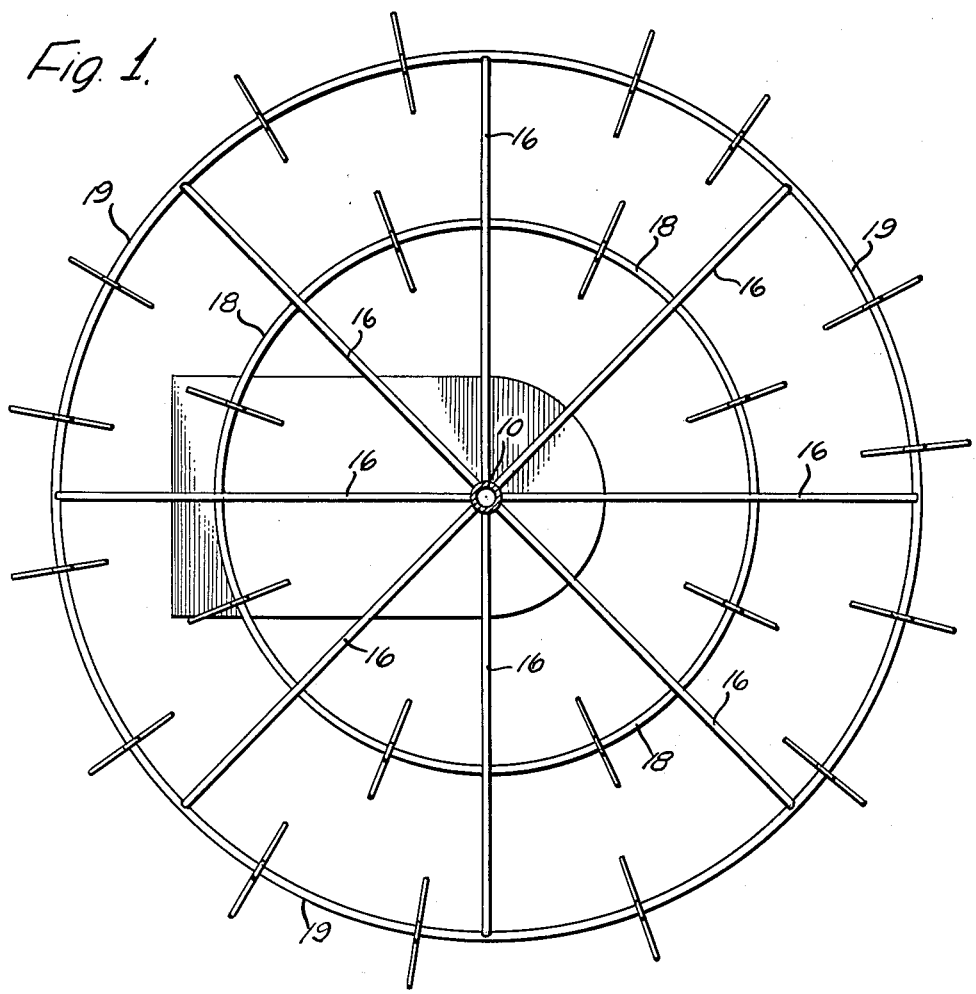
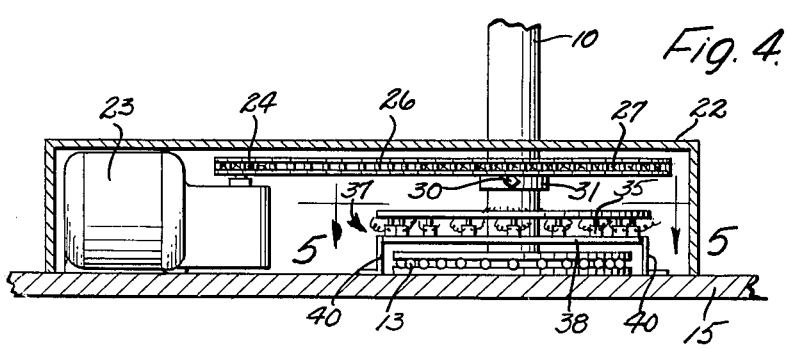
INVENTOR.
Phillip T. Snyder Feb. 21, 1956 P. T. SNYDER 2,735,539
AUTOMATIC ELECTRICALLY CONTROLLED CONVEYOR
Filed Oct. 1, 1954 3 Sheets-Sheet 2

INVENTOR.
Phillip T. Snyder

Feb. 21, 1956 P. T. SNYDER 2,735,539
AUTOMATIC ELECTRICALLY CONTROLLED CONVEYOR
Filed Oct. 1, 1954 3 Sheets-Sheet 3
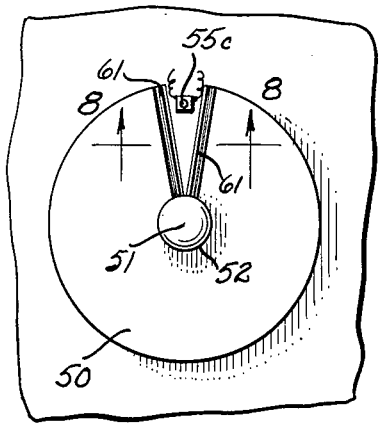
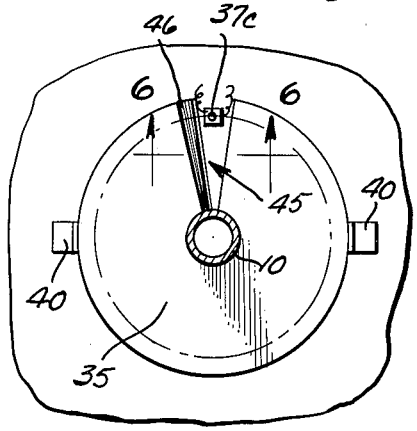
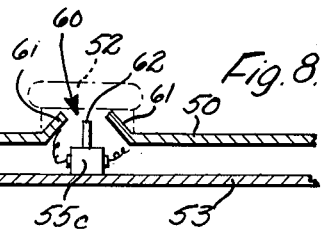
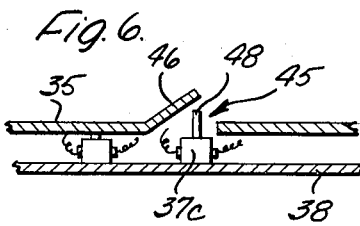
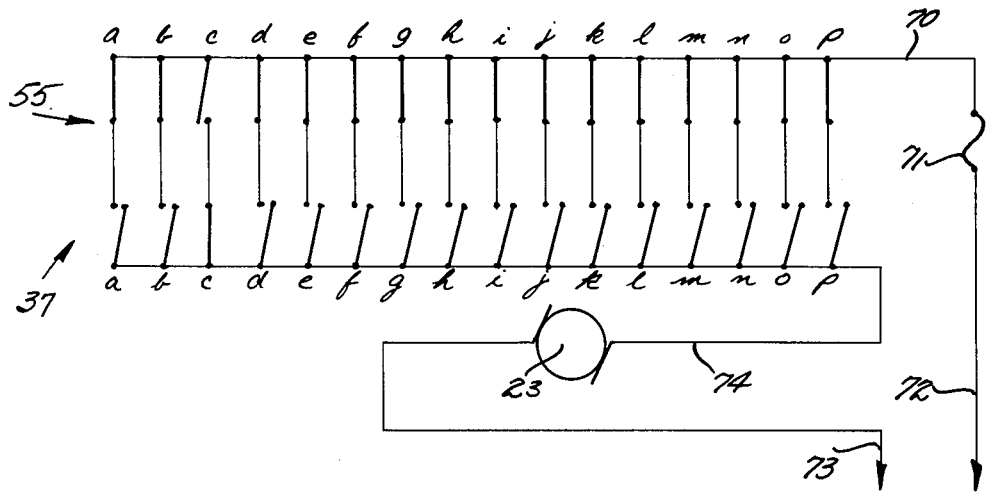
INVENTOR.
Phillip T. Snyder

# United States Patent Office 2,735,539
Patented Feb. 21, 1956

2,735,539
AUTOMATIC ELECTRICALLY CONTROLLED CONVEYOR

Phillip T. Snyder, Orangevale, Calif.

Application October 1, 1954, Serial No. 459,670

5 Claims. (Cl. 198—209)

The present invention relates to conveyors and particularly to automatic electrically controlled conveyors.

The problem often arises in industry and elsewhere to move material from one predetermined position to another predetermined position in a circular path, at the wish of and under control of an operator. Various arrangements have been proposed heretofore, but as far as is known, all such prior proposals were unduly complicated, difficult or expensive to maintain or had a high initial cost.

It is an object of the present invention to provide a rotary conveyor operated electrically which will make it possible for materials or goods to be transported from one predetermined position to another automatically under control of an operator and at his wish.

It is a further object of the present invention to provide a rotary conveyor which is simple to construct, which does not make use of any difficult to obtain complements, which may be simply operated, which is inexpensive to construct, and which can be controlled by an operator immediately adjacent said conveyor or at a point remote from said conveyor.

The various features of the invention as well as the advantages thereof will become more fully apparent from the following detailed specification which is to be read in conjunction with the accompanying drawings forming a part thereof, and in which:

Figure 1 is a top view of the rotary conveyor according to the invention;

Fig. 4 is a sectional view along the line 4—4 of Fig. 3 showing further details of the conveyor moving mechanism;

Fig. 5 is an elevation taken along the lines 5—5 of Fig. 4 and showing the switch control plate disposed within the housing of the drive mechanism;

Fig. 6 is a view taken along the line 6—6 of Fig. 5;

Fig. 7 is an elevation of a further switch control plate which cooperates with the switch control plate shown in Fig. 5;

Fig. 8 is a view taken along the lines 8—8 of Fig. 7; and

Fig. 9 is a circuit diagram showing the manner in which the various control switches are connected in order to energize the drive mechanism.

Figure 2:
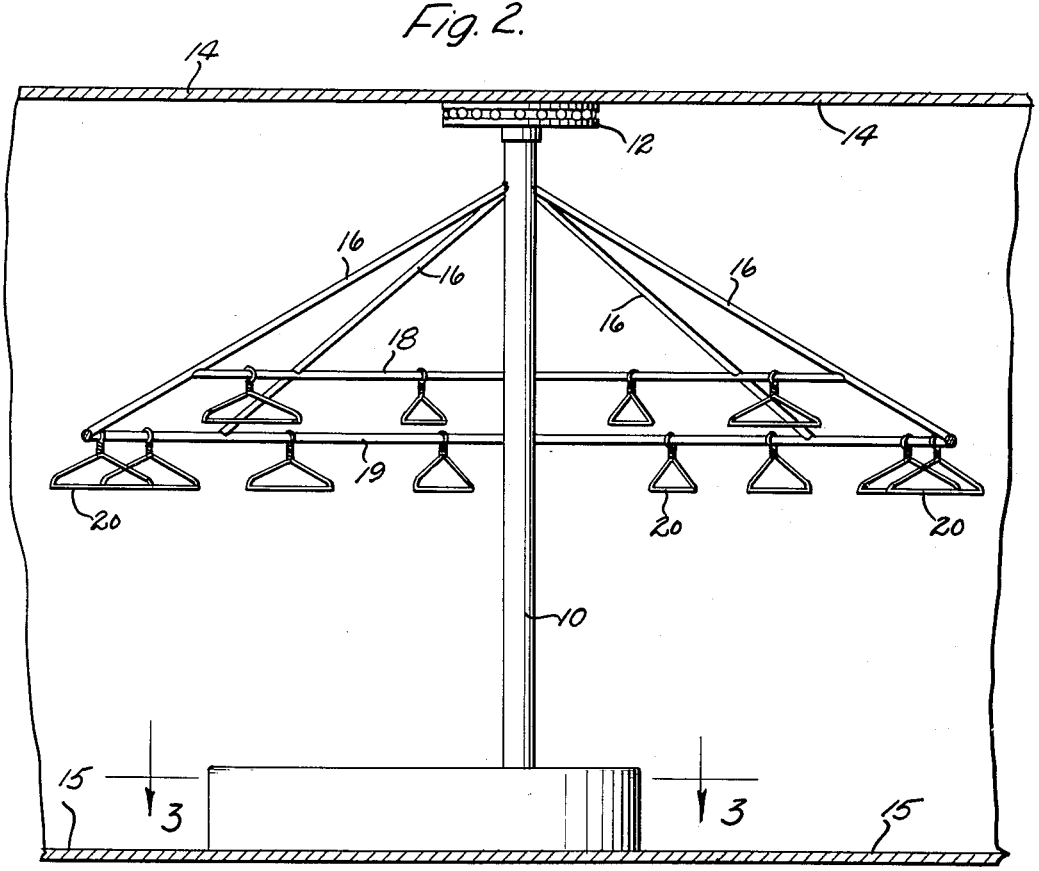
Fig. 2 is a side view of the rotary conveyor according to the invention.
Figure 3:
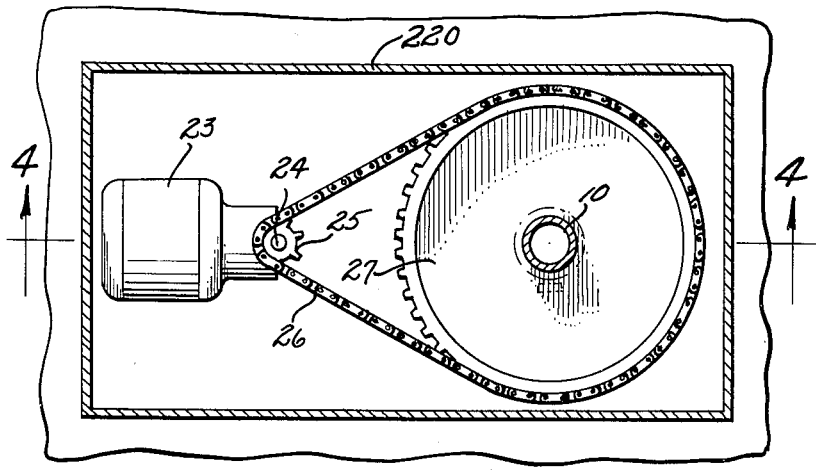
Fig. 3 is an elevation of a section along the lines 3—3 of Fig. 2 showing the drive mechanism responsible for causing the conveyor to move from one predetermined location to another.

Referring now to the drawings, 10 identifies a rotatable conveyor shaft supported at its ends by means of bearings 12 and 13 which are connected to the ceiling 14 and to the floor 15 respectively. Affixed to the conveyor shaft 10 as by welding are a plurality of radially and downwardly extending members 16 to which are connected circular, horizontal members 18 and 19 which are concentric with the conveyor shaft 10. Members 18 and 19 may be utilized to support material to be conveyed from one place to another. As shown in Fig. 2, hangers for clothes are shown depending from members 18, 19. It will be understood that hangers 20 are shown merely for the purpose of illustration and that any other suitable material may be conveyed by the conveyor according to the invention from one predetermined place to another.

The mechanism for driving the conveyor is disposed within a housing 22, Fig. 4, there being located within the housing 22 a motor 23 having a shaft 24 to which there is attached a sprocket 25 about which is chained a sprocket chain 26, said chain being in turn trained about a larger sprocket 27 which is fastened to the shaft 10 in any suitable manner, as by means of a bolt 30 on a collar 31 integral with the sprocket 27. While a chain drive has been shown, it will be understood that a V-belt pulley drive could be used equally well and that the chain drive has been shown merely for the purposes of illustration. The motor 23 may be a split phase 110 volt alternating current motor rated at one-quarter horse power and operating at 1,725 revolutions per minute. A ratio of forty to one between sprocket 27 and sprocket 25 may be used, and sprocket 25 may be a two inch sprocket, while sprocket 27 may be a twenty inch sprocket mounted on a three inch conveyor shaft 10. This would give the conveyor shaft a speed of approximately 4 R. P. M. The gear ratio may also be such that the conveyor shaft 10 will turn at approximately 2 to 3 R. P. M. In such case a sixty to one gear ratio may be used with a two inch output pulley on motor 23, if a V-belt drive is used, and with a twenty inch pulley on the main conveyor shaft, if a V-belt arrangement is used.

The conveyor parts 10, 16, 18 and 19 thus far described may be fabricated of any suitable material, such as pipe of the proper strength for conveying whatever material is to be conveyed.

Referring particularly to Fig. 4, it will be observed that a switch control plate 35 is disposed below gear 27 and attached to the conveyor shaft 10 in any suitable manner as by welding. Disposed beneath the switch control plate 35 are a plurality of micro-switches identified generally by the reference numeral 37, these being mounted on a stationary micro-switch mounting plate 38, which latter is mounted in any suitable manner to the floor 15, as by leg members 40. There are sixteen micro-switches 37 in all, identified 37a, through 37p and shown connected in a control circuit in Fig. 9. It will be understood that the micro-switches 37 are arranged in a circle which is concentric with the shaft 10 and that the micro-switches are equally spaced along such circle. Switch control plate 35 is provided with a V-shaped groove 45, see Fig. 5, a portion of the switch control plate defining the V-shaped opening 45 being bent upwardly as indicated at 46, so that when the conveyor 10 and the switch control plate 35 turn clockwise in the direction of the arrow, as seen in Fig. 5, the bent up portion 46 will operate the outwardly extending control members 48 of the micro-switches 37. It should be mentioned at this point that the micro-switches 37 are each of a type which is normally closed, that all of the switches 37, except the particular one of the switches 37 disposed underneath the V-shaped opening 45, will have their operating members 48 depressed whereby each switch 37 is maintained open save for the single switch 37 which happends to be disposed beneath the V-shaped opening 45. This latter is, of course, closed at such time.

Disposed at a suitable place, which may be either adjacent the conveyor or which may be remote therefrom, as in a control box, there is provided an operator switch control plate 50, Fig. 7, which is circular and which is rotatable about a central axis 51, said plate 50 being rotatable by the operator by means of a control knob 52. Disposed beneath operator control plate 50 is a stationary plate 53 on which there is mounted a plurality of micro-switches 55 which are under the control of the operator and which are interconnected in a manner to be described. It should be mentioned that there are sixteen switches 55 and that these switches are disposed in a circle and are spaced equally, said circle being within the confines of and below the plate 50. Switches 55 are identified a through p in Fig. 9. Operator control plate 50 is provided with a V-shaped opening 60 which has along each edge thereof an upwardly turned portion 61 of plate 50, whereby rotation by the operator of plate 50 in a clockwise or a counter-clockwise direction will be equally effective in causing upwardly turned portions 61 to operate and depress the operating members 62 of the micro-switches 55.

It will be observed that the upper contacts of each of the micro-switches 55a through 55p are connected to each other and to a wire 70 which is connected by means of a fuse 71 to one side of a line 72. The other side of the line 73 is connected to one side of the motor 23, the other side of the motor being connected to a wire 74 which is connected to the lower end of switches 37a through 37p which lower ends are all interconnected. It will be observed that the upper ends of switches 37a through 37p are each connected respectively to the lower ends of switches 55a through 55p.

It should be observed at this point that each of the micro-switches 55 is of the type which is normally open, but in view of the position of such switches, all of the switches 55 are kept closed by means of the fact that the plate 50 depresses their operating members 62, all switches, that is except for the particular one of the switches 55 disposed underneath the V-shaped opening 60. Any switch under the opening 60 is, of course, free to open. Therefore, as will be evident from a consideration of what has been said heretofore, all of the switches 55 are normally kept closed, except for the one under the V-shaped opening 60 and all of the switches 37 are normally kept open, except for the one which happens to be under the V-shaped opening 45. Accordingly, if an operator desires the conveyor to continue to rotate until it reaches the position corresponding to the location of switch 55c, the operator turns the knob 52 until the V-shaped opening 60 is disposed above the position of switch 55 corresponding to the desired position, which let us say is switch 55c, as shown in Figs. 7, 8 and 9. Remembering that one, at least, of the switches 37 will be closed always, it will be seen that the motor energizing circuit will be completed until the motor causes the conveyor shaft 10 and therefore the groove 45 to turn until switch 37c is in registration with groove or V-shaped opening 45, whereupon the circuit to the motor is de-energized in view of the fact that switch 55c is open.

It will be observed that there has been provided an exceedingly simple arrangement in which an operator merely has to turn a control plate 50 to a desired position, the beveled edges 61 of such plate 60 depressing the operating members 62 of each switch 55 in turn until the desired switch 55 is arrived at, whereupon the conveyor will automatically turn until it arrives at the desired predetermined position, whereupon the conveyor will automatically stop.

The operation is exceedingly simple, as are the controls, which are or may be of perfectly standard and inexpensive construction. It will be understood, of course, that suitable connecting wires are to be provided intermediate the constructions shown in Fig. 7 and Fig. 8, and the construction shown in Figs. 5 and 6, in order to complete the energizing circuit in the manner described. It should be emphasized that the foregoing disclosure is illustrative and not limiting and that it is obvious from the foregoing that many details of construction may be included and modified over and above that which has been herein disclosed and described without departing from the spirit and scope of this invention and it is desired therefore to be limited only by the scope of the appended claims.

What I claim as new and desire to protect by Letters Patent of the United States is:

1. In an electrically operated rotary conveyor, a rotatable conveyor shaft, driving means including a motor for rotating said shaft, a plurality of normally closed first switches arranged in a circle concentric with said shaft, each first switch having a first operating member, a first switch control plate connected to the shaft and engaging said operating members to keep all said switches open, said first plate having a V-shaped opening movable successively into position over said switches whereby at any given time one only of the said switches will be closed, a plurality of normally open second switches arranged in a circle, each said second switch having a second operating member, an operator actuated second switch control plate engaging said second operating members to keep all said normally open second switches closed, said second plate having a V-shaped opening, movable under control of the operator over a selected one of the normally open second switches, a power source and circuit connections connecting said motor to said power source by way of said closed and open switches until said shaft and said first control switch plate rotate so that said V-shaped opening in said first switch control plate arrives over the normally closed first switch corresponding to said selected normally open second switch.

2. A conveyor according to claim 1, said first switch control plate having an upwardly turned, bevelled portion extending radially from the conveyor shaft along one edge of the V-shaped opening in said plate.

3. A conveyor according to claim 2, said operator actuated second switch control plate having along each edge of the V-shaped opening therein an upwardly extending bevelled member engageable with the operating members of the second switches.

4. A conveyor according to claim 3, said driving means comprising a shaft on said motor, a sprocket on said shaft, a sprocket on said conveyor shaft, a chain interconnecting said sprockets, said motor being a split phase motor.

5. A conveyor according to claim 4, including a bearing at the upper end of said conveyor shaft, a bearing at the lower end of said conveyor shaft, radially and downwardly extending members attached to the upper end of said conveyor shaft, circular, horizontal members, said circular horizontal members being connected to said radially and downwardly extending members, whereby the material to be conveyed from one predetermined position to another may be connected to said horizontal members.

No references cited.